US006966860B2

(12) United States Patent
Heitmann et al.

(10) Patent No.: US 6,966,860 B2
(45) Date of Patent: Nov. 22, 2005

(54) AUTOMATIC TRANSMISSION FOR MOTOR VEHICLES

(75) Inventors: Axel Heitmann, Friedrichshafen (DE); Ralf Dreibholz, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 94 days.

(21) Appl. No.: 10/485,012

(22) PCT Filed: Aug. 12, 2002

(86) PCT No.: PCT/EP02/09089

§ 371 (c)(1),
(2), (4) Date: Jan. 28, 2004

(87) PCT Pub. No.: WO03/016749

PCT Pub. Date: Feb. 27, 2003

(65) Prior Publication Data
US 2004/0211604 A1    Oct. 28, 2004

(30) Foreign Application Priority Data
Aug. 17, 2001  (DE) ............................. 101 40 424

(51) Int. Cl.$^7$ ............................. F16H 3/72; B60K 6/02
(52) U.S. Cl. ............................. 475/10; 475/151
(58) Field of Search ............................. 475/5, 10, 149, 475/151; 180/65.7

(56) References Cited

U.S. PATENT DOCUMENTS

| 5,106,352 A | 4/1992 | Lepelletier ............... 475/280 |
| 5,558,175 A | 9/1996 | Sherman ................. 180/65.2 |
| 5,903,061 A | 5/1999 | Tsuzuki et al. ........... 290/40 C |
| 5,904,631 A | 5/1999 | Morisawa et al. ............. 475/5 |
| 6,081,042 A | 6/2000 | Tabata et al. ............... 290/45 |
| 6,306,057 B1 * | 10/2001 | Morisawa et al. ............. 475/5 |
| 6,344,008 B1 | 2/2002 | Nagano et al. ............... 475/1 |
| 6,595,895 B2 * | 7/2003 | Suzuki et al. ................. 475/5 |
| 6,887,175 B2 * | 5/2005 | Yamauchi et al. ........... 475/10 |

FOREIGN PATENT DOCUMENTS

DE          196 06 771 A1    8/1997    ......... B60K 17/06

(Continued)

OTHER PUBLICATIONS

Lepelletier, Pierre, Transmission automatique ultra-compacte a 5 ou 6 vitesses pour voitures particuliéres, *Ingenieurs de l'Automobile*, 1993, No. 678, pp. 16-17.

(Continued)

*Primary Examiner*—Sherry Estremsky
(74) *Attorney, Agent, or Firm*—Davis & Bujold, P.L.L.C.

(57)     ABSTRACT

An automatic transmission for motor vehicles (1) comprising a drive shaft (2) that can be linked with an internal combustion engine and an output shaft (3) that can be linked with at least one motor vehicle axle. Furthermore, it suggests a manual shiftable transmission (4) that comprises a first and a second planetary gear set (5, 6), several shift elements (7, 8, 9, 10, 11, 19) as well as an electric engine (14), which is provided as a starter/generator and/or for the continuous adjustment of the shiftable transmission (4) and/or for the at least partially electric driving operation of a motor vehicle. Pursuant to the invention the electric engine (14) can be connected to a first and/or a second shaft of the first planetary gear set (5) by means of two additional shift elements (12, 13).

8 Claims, 1 Drawing Sheet

FOREIGN PATENT DOCUMENTS

Figure 1:
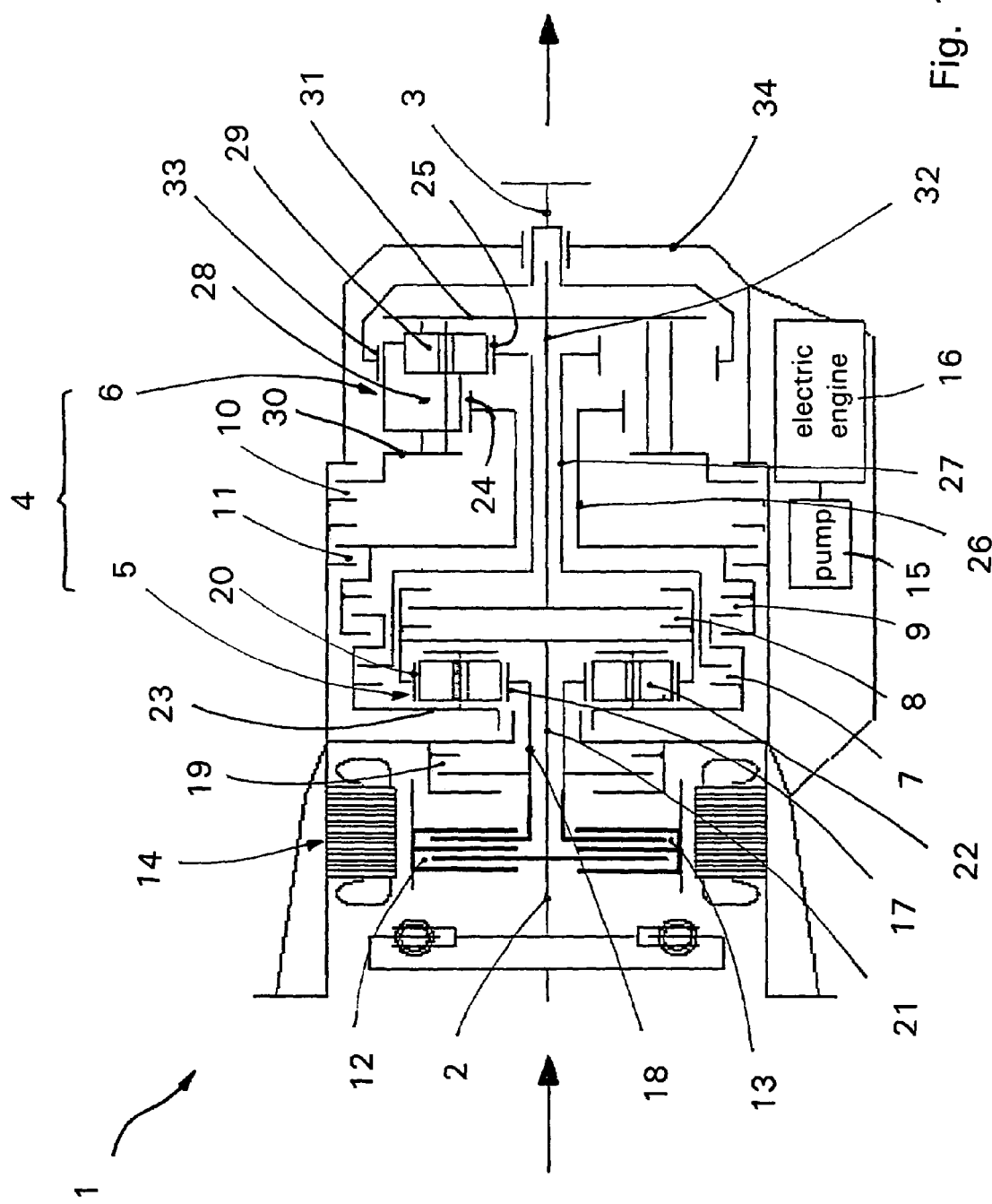

| | | | | |
|---|---|---|---|---|
| DE | 197 39 906 | A1 | 3/1999 | ........... H02P 17/00 |
| DE | 695 10 897 | T2 | 11/1999 | ........... B60K 6/02 |
| DE | 199 17 665 | A1 | 10/2000 | ........... B60L 11/00 |
| DE | 199 23 315 | A1 | 11/2000 | ........... F02N 11/04 |
| DE | 197 17 884 | C2 | 2/2001 | .......... B60K 17/06 |
| DE | 100 36 966 | A1 | 4/2001 | ........... B60K 6/00 |
| EP | 0 434 525 | B1 | 6/1991 | ............. F16H 3/66 |
| JP | 2004-239278 | * | 8/2004 | ............ F16H 3/72 |

OTHER PUBLICATIONS

Tenberge, Dr.-Ing. P. and Hofmann, Prof. Dr.-Ing W., "Mechanisch-elektrische Fahrzeuggetriebe im Vergleich", *VDI Berichte*, 1998, No. 1393, pp. 551-557.

Tenberge, Prof. Dr. P., "E-Automat Automatikgetriebe mit Esprit", *VDI Berichte*, 2001, No. 1610, pp. 455-479.

* cited by examiner

AUTOMATIC TRANSMISSION FOR MOTOR VEHICLES

The invention relates to an automatic transmission for motor vehicles, comprising a drive shaft that can be linked with an internal combustion engine and an output shaft that can be linked with at least one motor vehicle axle as well as a manual mechanically shifted transmission that comprises a first and a second planetary gear set, wherein the first planetary gear set is a simple planetary gear set and the second planetary gear set is a double planetary gear set, especially a Ravigneaux gear set. Moreover shift elements for shifting several forward gears and one reverse gear are provided as is an electric engine, which can function as a starter/generator and/or for the continuous adjustment of the speed of the transmission and/or for the at least partially electric operation of a motor vehicle.

A multi-speed automatic transmission with a manual mechanically shifted transmission of the above kind is described for example in EP 434 525 B1. This transmission contains a Ravigneaux gear set, which is expanded by one planetary gear set as the front-mounted transmission.

Hybrid drives for motor vehicles are also known from the prior art. These partially electric propulsion systems comprise generally an internal combustion engine as the drive assembly, which enables great performance and a great operating range of the motor vehicle. In addition, at least one electric engine is arranged between the internal combustion engine and the transmission, which enables the benefits of electric drive systems, such as e.g., braking energy recuperation, emission-free driving and a boost operation. Such a hybrid drive system is described for example in DE 199 17 665 A1. Said hybrid propulsion system contains a first electric engine in a drive train between a combustion engine and a multi-speed vehicle transmission and a second electric engine that is permanently connected a transmission input shaft. Between the electric engines, which each can be operated as an engine and as a generator, a shiftable clutch is arranged. This leads beneficially to a very economical and environmentally friendly operation, which is purely electric during start-up or at lower vehicle speeds, such as e.g. during a stop-and-go operation or during a parking operation. By releasing the second clutch between the combustion engine and electric engine the combustion engine, which is already running, is connected so that the vehicle's full power is available.

Another drive system for a motor vehicle is known from DE 199 23 315 A1. This document describes a vehicle that is driven by a drive aggregate comprising a gear unit and at least one electric machine that can be operated as a motor and/or generator.

Supplementing the above-mentioned 6-gear automatic transmission pursuant to EP 434 525 B1, additionally an automatic transmission with an electric engine that is designed as starter/generator has been described (VDI Reports No. 1610, 2001, pages 455 to 479, "E-Automat, Automatikgetriebe mit Esprit" ("Electric Engine, Automatic Transmission with Esprit" ), Professor Dr. P. Tenberge, Chemnitz, Germany), which is provided for the purpose of shifting seven forward gears and one reverse gear as well as for continuously varying the gear ratio in five forward driving ranges. Here, the space gained from the elimination of the hydrodynamic converter is now used for an electric engine. The starting process can thus occur in three different ways, namely purely with the electric engine or with the internal combustion engine with another brake as a starting element or with the internal combustion engine together with the electric engine, which in this case assumes the function of the brake. By adding a control unit as well as a storage battery, additional uses are gained, which are a comfortable start/stop operation, a partially possible continuous driving operation with electric booster, the possible energy recuperation during braking processes as well as a purely electric, emission-free operation. In the above-mentioned electric engine the internal combustion engine and the electric engine are coupled with each other by means of a planetary gear set so that the planetary gear set establishes the torque ratio of the two drive assemblies. The electric engine can, therefore, produce the additional torque not independently from the internal combustion engine, for example for boost purposes.

It is the object of the present invention to provide another shifting possibility between the electric engine and the mechanical shiftable transmission without connecting the electric engine permanently with a gear step in order to enable on one hand an additional boosting operation that is independent from the internal combustion engine and a supply to the electric system that is independent from the internal combustion engine and on the other hand a transmission with several gear steps.

This object is achieved with an automatic transmission for motor vehicles of the above-mentioned kind with the features of Claim 1. Pursuant to the invention, the electric engine is connected by means of two additional shift elements with a first or a second shaft of the first planetary gear set. By using these additional shift elements, for example clutches, it is possible on one hand after starting the internal combustion engine to connect the electric engine directly with the internal gear shaft of the first planetary gear set, wherein said internal gear shaft corresponds both to the crankshaft and the gear input shaft. This way a beneficially unrestricted boost operation as well as a permanent supply to the electric system are enabled.

On the other hand the electric engine can be connected by means of the second shift element directly with the sun gear of the first planetary gear set, particularly with the sun gear shaft of the first planetary gear set. Since the two shift elements, for example, are designed as multi-disk clutches and can be shifted or controlled independently from each other, the first shift element can be engaged and by releasing the second shift element by means of the electric engine, a continuous variation of the speed of the first planetary gear set can be accomplished.

By disengaging additionally both shift elements, the first planetary gear set can be blocked so that two additional forward gears as well as one additional reverse gear can be shifted. This way, with the transmission pursuant to the invention beneficially nine forward and two reverse gear steps as well as five driving range can be continuously adjusted.

Alternatively to the above-mentioned multi-disk clutches, the shift elements can also be designed as positive clutches that can be shifted independently from each other or also one shift element can be designed as a free wheel.

Beneficially, the electric engine and the shift elements are arranged coaxially to the input shaft and the shift elements are arranged radially between the electric engine and the input shaft so that a space-saving configuration of the two additional shift elements is suggested.

Additional objectives, benefits and designs of the invention result from the following description of the exemplary design. All described or depicted features, either alone or also in any random reasonable combination, form the object of the invention, independent of their combination in the claims and their reference.

The sole FIGURE shows an automatic transmission 1 for motor vehicles pursuant to the present invention. The transmission 1 consists essentially of a drive shaft 2, which is connected on the input side for example with an internal combustion engine (not shown) via a torsional-vibration damper. On the output side, an output shaft 3 is provided that can be linked with at least one vehicle axle. Between the two shafts 2 and 3 a shiftable transmission 4 is arranged, which consists of a first gear set 5 and a second gear set 6 with several clutches 7, 8, 9 and two brakes 10 and 11. The first gear set 5 consists, for example, of a simple planetary gear set, which is arranged upstream from the second gear step 6, a Ravigneaux set. Such a configuration makes, for example, an automatic transmission with six forward gears and one reverse gear possible.

A sun gear 17 of the first gear set 5 is connected via a sun gear shaft 18 with a starting brake 19 so that a vehicle that is equipped with said automatic transmission 1 can start without a hydrodynamic converter. An electric engine 14 is provided as a starter/generator, wherein said electric engine 14 furthermore is assigned en electronic control system (not shown) and a storage battery.

By combining the shiftable transmission 4 with the electric engine 14, a vehicle that is equipped with it can start from a neutral gear.

Pursuant to the invention, between the electric engine 14 on one hand as well as the drive shaft 2 that is connected with ane internal gear 20 of the first planetary gear set 5 and the sun gear shaft 18 on the other hand, two additional shift elements, namely, a fourth clutch 12 and a fifth clutch 13, are provided. For starting the internal combustion engine, for example, the clutch 13 is disengaged and the starter torque is supplied to the first gear set 5 via the sun gear shaft 18. This doubles the starter torque that is transmitted to the drive shaft 2. During driving operation, not only seven forward gears with fixed gear ratios, but also five forward driving ranges with continuously variable gear ratios can be selected due to the speed-variable meshing of the electric engine 14 with the sun gear shaft 18. Moreover during driving, especially braking operations, the electric engine 14 allows energy recuperation to be utilized by storing electric energy temporarily in the energy storage system (not shown).

Such a vehicle propulsion system allows a purely electric driving operation both forward and backward, e.g., while maneuvering inside cities or other zones to be realized, where an emission-free operation is desirable.

Pursuant to the invention, through the use of two additional shift elements 12, 13, it is now possible after starting the internal combustion engine to link the electric engine 14, via the clutch 12, with the drive shaft 2. The drive shaft 2 is directly linked to the crankshaft of the internal combustion engine. The benefits of the afore-mentioned vehicle transmission 1 can be supplemented with a manual mechanical shiftable transmission 4 and an electric engine 14 by one essential advantage, namely enabling increased torque for the driver upon request so that an unrestricted boost operation is possible. Furthermore, such a shift arrangement offers a permanent electric supply for the electric system during generator operation of the electric engine 14.

By disengaging both shift elements 12, 13, the first planetary gear set 5 revolves in the block so that the combination of the first and second planetary gear sets 5, 6 permits two additional forward and one additional reverse gear to be shifted.

The internal gear 20 of the first planetary gear set 5 is permanently linked to the drive shaft 2 by means of an internal gear shaft 21. The planetary gears 22 are connected with a planet carrier 23, which can be connected with the second planetary gear set 6 by means of the clutches 7, 8, 9 or can be blocked with a housing 34 by means of the brake 11.

The second double planetary gear set 6 consists essentially of a first sun gear 24 and a second sun gear 25, which can be connected with the first planetary gear set 5 via a first sun gear shaft 26 as well as a second sun gear shaft 27 or can be blocked with the housing 34 by means of the brake 11. A set of first planetary gears 28 is seated on a first planet carrier 30, which can be blocked with the housing 34 by means of the brake 10. Both the first planetary gears 28 and second planetary gears 29 can be linked to the first planetary gear set 5 by means of a second planet carrier 31 and an intermediate shaft 32. An internal gear 33 of the second planetary gear set 6 is directly linked to the output shaft 3 of the vehicle transmission 1.

REFERENCE NUMERALS 1 vehicle transmission
2 drive shaft
3 output shaft
4 shiftable transmission
5 first planetary gear set
6 second planetary gear set (Ravigneaux set)
7 first clutch
8 second clutch
9 third clutch
10 first brake
11 second brake
12 fourth clutch
13 fifth clutch
14 electric engine
15 pump
16 electric engine
17 sun gear
18 sun gear shaft
19 third brake
20 internal gear
21 internal gear shaft
22 planetary gear
23 planet carrier
24 first sun gear
25 second sun gear
26 first sun gear shaft
27 second sun gear shaft
28 first planetary gears
29 second planetary gears
30 first planet carrier
31 second planet carrier
32 intermediate shaft
33 internal gear
34 housing

What is claimed is:

1. An automatic transmission (1) for a motor vehicle, comprising:
   a drive shaft (2) that can be linked with an internal combustion engine;
   an output shaft (3) that can be linked with at least one motor vehicle axle;
   and a mechanically shiftable transmission (4) including a first planetary gear set arranged upstream of a second planetary gear set (5, 6), wherein the first planetary gear set (5) is a simple planetary gear set and the second planetary gear set is a double planetary gear set (6), and
a plurality of shifting elements,
an electric engine (14), and
first and second additional shift elements (12, 13) for selectively connecting the electric engine to a first and a second shaft of the first planetary gear set, whereby the electric engine selectively operates as at least one of:
a starter/generator,
an electric engine for continuously adjusting a speed of the transmission, and
an electric engine to at least partially drive the motor vehicle.

2. The automatic transmission (1) for a motor vehicle according to claim 1, wherein the electric engine (14) is connected via the first additional shift element (12) with an internal gear (20) of the first planetary gear set (5).

3. The automatic transmission (1) for a motor vehicle according to claim 1, wherein the electric engine (14) is connected via the second additional shift element (13) with a sun gear (17) of the first planetary gear set (5).

4. The automatic transmission (1) for a motor vehicle according to claim 1, wherein the first and second additional shift elements (12, 13) are multi-disk clutches and are shifted and controlled independently from each other.

5. The automatic transmission (1) for a motor vehicle according to claim 1, wherein the first and second additional shift elements are positive clutches and are shifted independently from each other.

6. The automatic transmission (1) for a motor vehicle according to claim 1, wherein a first shift element of the first and second additional shift elements is a free wheel.

7. The automatic transmission (1) for a motor vehicle according to claim 1, wherein the electric engine (14) and the first and second additional shift elements (12, 13) are arranged coaxially to an input shaft (2) and the first and second additional shift elements (12, 13) are arranged radially between the electric engine (14) and the input shaft (2).

8. The automatic transmission (1) for a motor vehicle according to claim 1, wherein the second planetary gear set is a Ravigneaux gear set.

* * * * *